United States Patent [19]
Ansley et al.

[11] Patent Number: 5,541,769
[45] Date of Patent: Jul. 30, 1996

[54] UNIFORM-BRIGHTNESS, HIGH-GAIN DISPLAY STRUCTURES AND METHODS

[75] Inventors: David A. Ansley, Sterling; James D. Zimmerman, Reston; Ashok Sisodia, Herndon, all of Va.

[73] Assignee: Hughes Training, Inc., Los Angeles, Calif.

[21] Appl. No.: 341,811

[22] Filed: Nov. 18, 1994

[51] Int. Cl.$^6$ .................................................. G03H 1/14
[52] U.S. Cl. .............................................. 359/451; 359/443
[58] Field of Search ................................. 359/443, 451, 359/454, 456

[56] References Cited

U.S. PATENT DOCUMENTS 4,732,441  3/1988  Cheng ............................. 300/125
5,151,799  9/1992  Ansley ............................ 359/11

Primary Examiner—David M. Gray
Assistant Examiner—D. P. Malley
Attorney, Agent, or Firm—Jeannette M. Walder; Wanda K. Denson-Low

[57] ABSTRACT

A uniform-brightness, high-gain projection screen is especially suited for reflecting radiation from a projector to a viewer who is spaced from the projector along a projection axis. The screen is formed with a plurality of reflective faces that each form at least a portion of a ring that is transverse to the projector axis, have different spacings from the projector and are axially tilted to set the projector-face angle equal to the viewer-face angle. The faces are preferably defined by a plurality of tiles that are bonded to the interior of a projection dome such as a flight simulator dome.

23 Claims, 5 Drawing Sheets

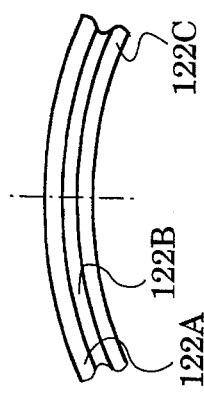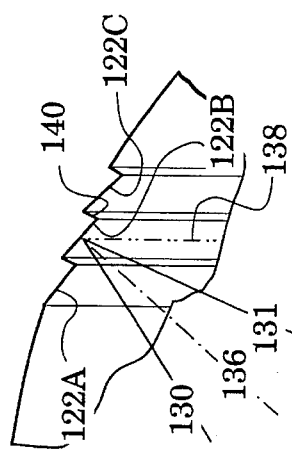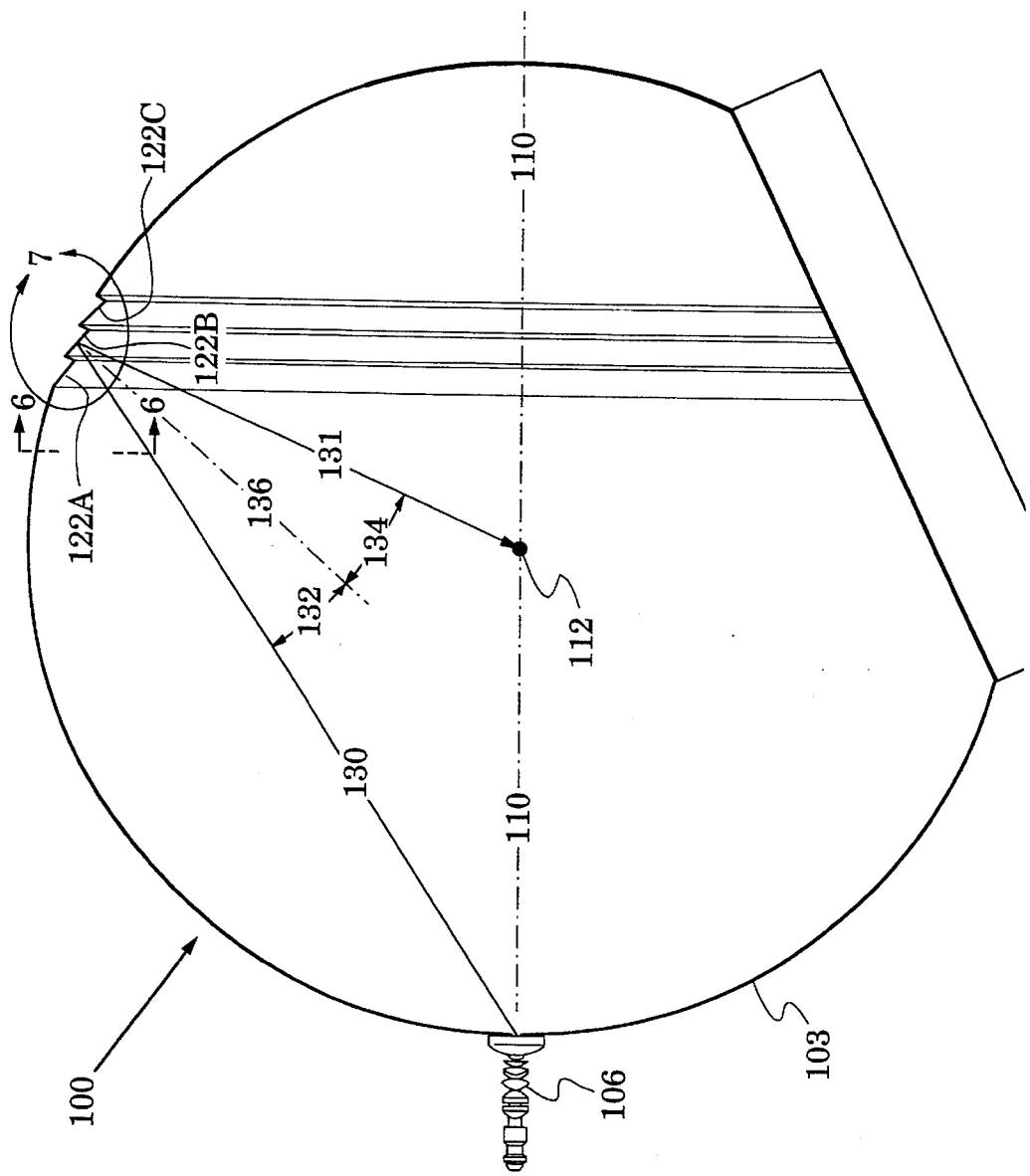

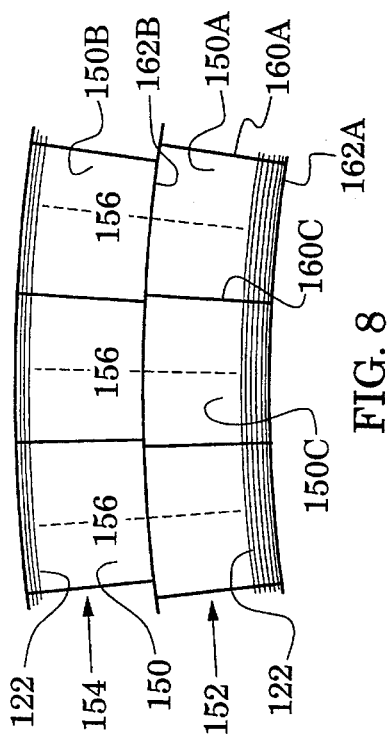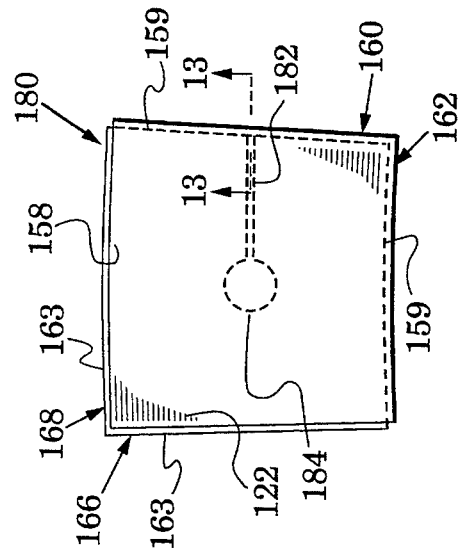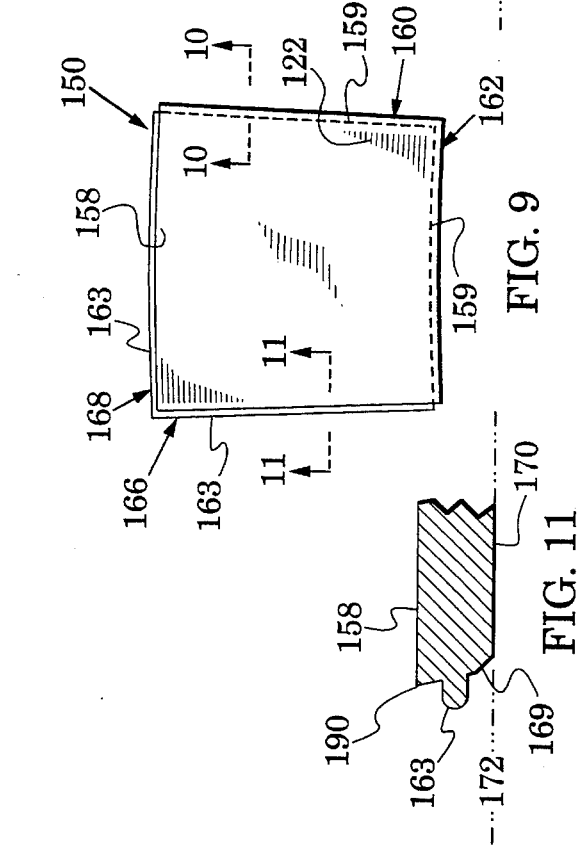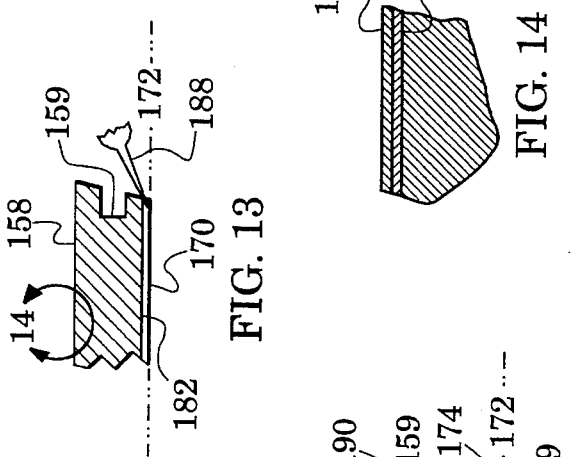

UNIFORM-BRIGHTNESS, HIGH-GAIN DISPLAY STRUCTURES AND METHODS

BACKGROUND OF THE INVENTION

1. Field of the Invention

The present invention relates generally to visual displays, and more particularly to dome-type displays and display methods that require a significant spatial distance between projectors and viewers.

2. Description of the Related Art

An exemplary application of dome-type visual displays is found in flight simulators which have proven to be effective, cost-saving training aids. In a flight simulator, a pilot who is undergoing training or retraining can practice normal and emergency flying procedures without leaving the ground. Simulator training is less expensive than training in an actual aircraft and, in addition, avoids the dangers of flying during the learning process.

In a typical flight simulator, the pilot is presented with a visual display which can be programmed to depict training scenes that change in response to the pilot's control commands. One or more high-intensity projectors are arranged to form the display on the surface of a screen or dome without the projectors obscuring the display. Because large passenger aircraft have a limited range of visibility, the projectors can be out of sight if they are arranged just above and behind a simulated flight deck. From that location they can illuminate a screen positioned ahead of the flight deck. In this arrangement, the projectors and the viewing position are in close proximity.

However, in high-performance fighter aircraft, the pilot has a 360° range of visibility. Therefore, in simulators intended for these aircraft, the projectors are generally hidden just outside a dome that surrounds the pilot's viewing position. The projectors illuminate the dome's interior by projecting through ports in the dome's surface. Therefore, the projectors and the viewing position are necessarily spaced far apart along the projectors' illumination axes. This axial spacing makes it difficult to obtain a uniform-brightness, high-gain display.

In response to this problem, simulator domes have been constructed with front and rear sections that are each formed as half ellipsoids. The foci of the forward half ellipsoid are positioned at the pilot and a forward projector. In a similar manner, the foci of the aft half ellipsoid are positioned at the pilot and an aft projector. The forward projector illuminates the forward ellipsoid and all reflected radiation from that surface is directed to the pilot at the common ellipsoid focus. The aft projector illuminates the aft screen and all reflected radiation from that surface is also directed to the pilot at the common focus.

Although elliptical dome construction obtains uniform brightness by directing all projector radiation to the pilot location, it forms a visually distracting cusp at the intersection of the two elliptical halves. Also, elliptical structures create variable pilot-to-screen distances which can be disconcerting because pilots have to refocus their eyes as they scan across the screen. In addition, elliptical dome construction is relatively expensive.

Spherical simulator domes are less expensive to construct and present a constant pilot-to-screen distance. FIG. 1 illustrates an exemplary spherical simulator dome 20 that is approximately 12.2 meters in diameter. The dome 20 has projector ports 22 and 24 and a pilot viewing position 26, all of which are indicated by darkened circles. An aft projector directed through the port 22 illuminates the aft hemisphere 28 and a forward projector directed through the port 24 illuminates the forward hemisphere 30 (the projectors are typically referred to by the hemisphere which they illuminate).

Positions on the dome 20 are conveniently described with reference to azimuth and elevation angles. Accordingly, the elevation angles are indicated at the right side of the dome. It is intended that the pilot face the forward hemisphere 30. Therefore, in FIG. 1 the right side of the dome 20 is designated to have an azimuth angle of 0° and the left side to have an azimuth angle of 180°. In terms of azimuth and elevation, the aft projector is positioned at 0° azimuth, 14° elevation and the forward projector is positioned at 180° azimuth, 25° elevation. The illuminated hemispheres meet along a partition arc indicated by the broken line 32 that is angled at 84.5°.

The projector port elevations are selected to facilitate the generation of a full display to the pilot who is seated in a simulated aircraft. Fighter aircraft often provide forward pilot visibility down to −20° elevation. The position of the projector port 24 enables the aft projector's radiation to pass over the aircraft canopy and illuminate the forward hemisphere 30 down to approximately −20° elevation. The projector port 22 is high enough so that the aircraft structure behind the pilot does not create any illumination gaps in the aft hemisphere 28 that are visible to the pilot.

Unfortunately, the simulator dome arrangement shown in FIG. 1 causes its display brightness to vary over the forward and aft hemispheres 28, 30, i.e., some portions of the display appear dimmer to the pilot than do other portions. Apparent brightness is technically defined as radiance, which is the radiant intensity of radiation per unit of projected area normal to a specified direction. Radiance is expressed as $d^2\Phi/(d\omega\, dA\, \cos\theta)$ in which $\Phi$ is radiant flux, $\omega$ is the solid angle about a radiating surface, A is projected area and $\theta$ is the measurement angle from a line normal to the radiating surface.

The source of the uneven brightness in the dome 20 can be understood with reference to FIGS. 2 and 3. FIG. 2 shows a light ray 34 that is incident upon a screen (surface) 36 with an angle of incidence 38. An imaginary reflected ray 40 is shown to have an angle of reflection 42 that is equal to the angle of incidence 38. Angles of incidence and reflection are always defined from a line 44 that is normal to the screen 36. Such lines are typically referred to as screen normals.

The angle 42 is termed the specular angle. In a low-gain screen, the specular angle has no significance, i.e., radiation along the specular angle is no brighter than radiation along any other reflected angle. In the low-gain screen 36, the actual reflected light intensity ($d\Phi/d\omega$) varies as the cosine of the reflected angle. This is indicated by exemplary light rays 46 whose magnitudes are limited by a broken circle 48. To determine radiance, the intensity of each light ray must be divided by the projected area $A\cos\theta$. The cosine dependance cancels and radiance is therefore a constant. When a screen has a radiance that is independent of the viewing angle, it is said to be perfectly diffuse or to be a Lambertian screen; one that is uniformly bright in all directions.

FIG. 3 illustrates light reflection from a high-gain screen 50 which reflects radiation in a preferential direction defined by the specular angle 42. In this direction, the screen 50 appears brighter than the Lambertian screen 36 of FIG. 2, while in directions far away from the specular angle the screen 50 will appear dimmer than the screen 36. Obviously, if more of the incident energy is reflected along and near the specular angle, then less energy is necessarily reflected at other angles. The light ray along the specular angle 42 will have the greatest intensity and the intensity of other light rays 54 will fall off with angular distance from it, as indicated by the broken ellipse 56. The amplitude of the specular ray 52 indicates the intensity gain in this direction relative to the Lambertian screen 36.

Attention is now redirected to FIG. 1, which shows two exemplary light rays 60, 62 issuing from the projector port 24, which is spaced from the viewing position 26 along a screen normal 63. The light ray 60 is projected at an angle 64 to the screen normal 63, and the light ray 62 is projected at a smaller angle 66 relative to this screen normal. The ray 60 forms a projector-screen angle 72 with the screen normal 74 and the ray 62 forms a projector-screen angle 78 with the screen normal 80. The specular ray 70, therefore., defines an equal angle 72 with the screen normal 74 and the specular ray 76 defines an equal angle 78 with the screen normal 80. The pilot viewing position 26 is at the center of the dome so that the pilot-screen angle is always zero, i.e., the viewing position 26 is intersected by all screen normals.

If the dome screen has significant gain, it will appear dimmer when viewed along the screen normal 74 than when viewed along the screen normal 80 because the viewing position 26 is further from the specular ray 70 than it is from the specular ray 76. In general, the less the angular difference between the projector screen angle and the viewer-screen angle, the brighter the screen will appear because the viewer is closer to the specular ray.

Lowering the gain of the dome screen will reduce the brightness variation but at the cost of lower overall screen brightness. The loss of overall brightness can be offset by increasing the intensity of the projectors, but this is technically difficult and prohibitively expensive.

SUMMARY OF THE INVENTION

The present invention is directed to uniform-brightness, high-gain display structures and methods which are especially suited for reflecting radiation from a projector to a viewer who is spaced from the projector along a projector-viewer axis. Uniform brightness is achieved with a plurality of reflective ring-like faces which are each axially tilted to set their projector-face angles equal to their viewer-face angles, are axially spaced from the projector so as to appear contiguous to the viewer, and are made sufficiently narrow so that the boundaries between adjacent faces is not distinguishable by the viewer. The specular gain of these structures can be set to any selected value without reducing the uniformity of their brightness.

The reflective faces are preferably formed on an outer surface of tiles that are contiguously bonded over an inner projection surface. In one embodiment, one portion of each tile's perimeter defines a tongue and another portion defines a groove to receive the tongue of another tile when they are contiguously positioned. The tiles are finished and coated to give the faces a selected specular gain.

The novel features of the invention are set forth with particularity in the appended claims. The invention will be best understood from the following description when read in conjunction with the accompanying drawings.

BRIEF DESCRIPTION OF THE DRAWINGS

FIG. 5 is a rotated and simplified view of FIG. 4 which illustrates a plurality of reflector faces that are associated with a selected projector;

FIG. 6 is a view along the plane 6—6 of FIG. 5;

FIG. 7 is an enlarged view of the structure within the curved line 7 of FIG. 5;

FIG. 8 is a enlarged view along the plane 8—8 of FIG. 4;

FIG. 9 is a plan view of one embodiment of the tiles of FIG. 8;

FIG. 10 is an enlarged view along the plane 10—10 of FIG. 9;

FIG. 11 is an enlarged view along the plane 11—11 of FIG. 9;

FIG. 12 is a plan view of another embodiment of the tiles of FIG. 8;

FIG. 13 is an enlarged view along the plane 13—13 of FIG. 12; and

FIG. 14 is an enlarged view of the structure within the curved line 14 of FIG. 13.

DESCRIPTION OF THE PREFERRED EMBODIMENTS

Figure 1:
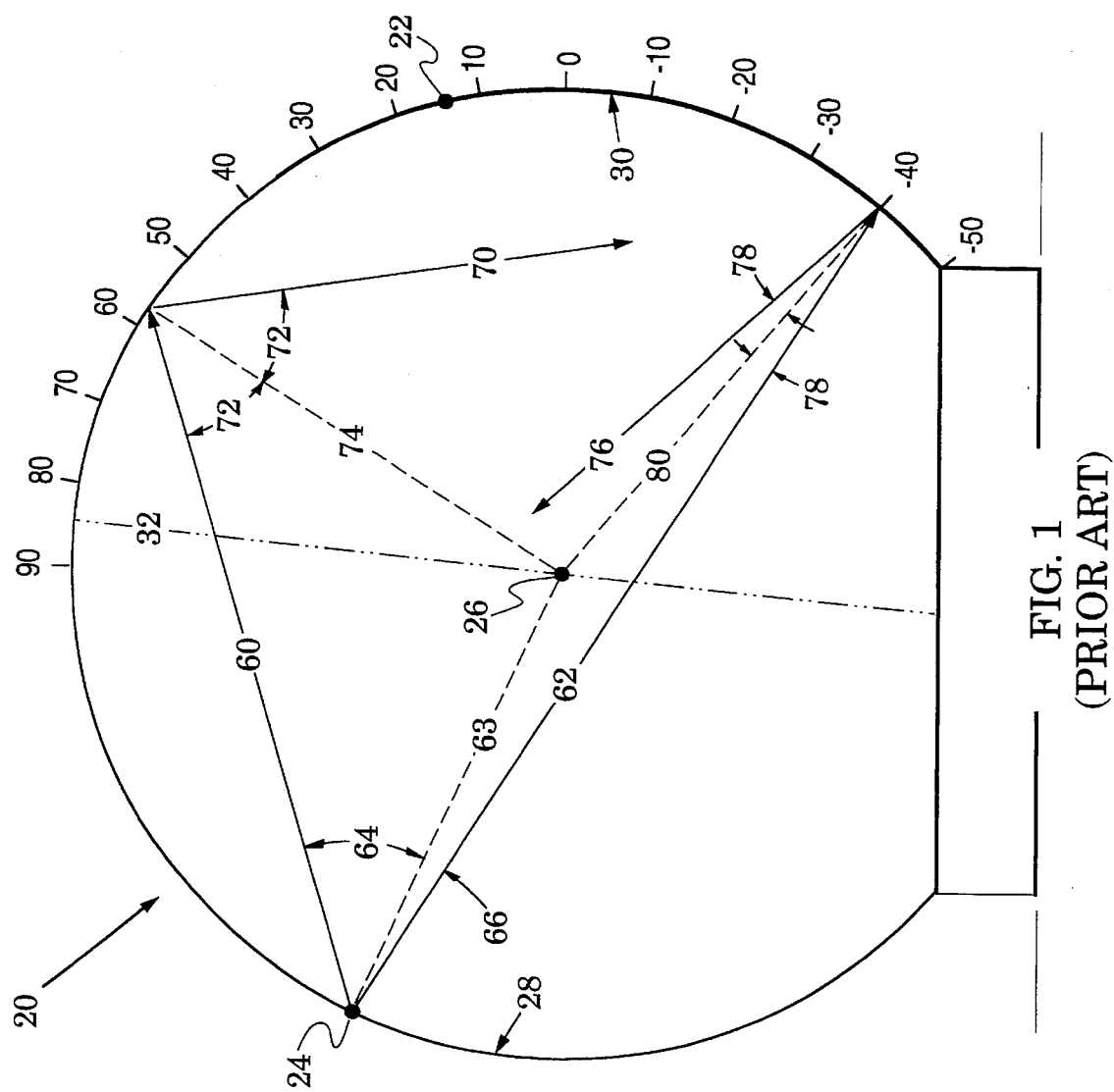
FIG. 1 is a schematized, sectional, elevation view of a prior art flight simulator dome.
Figure 3:
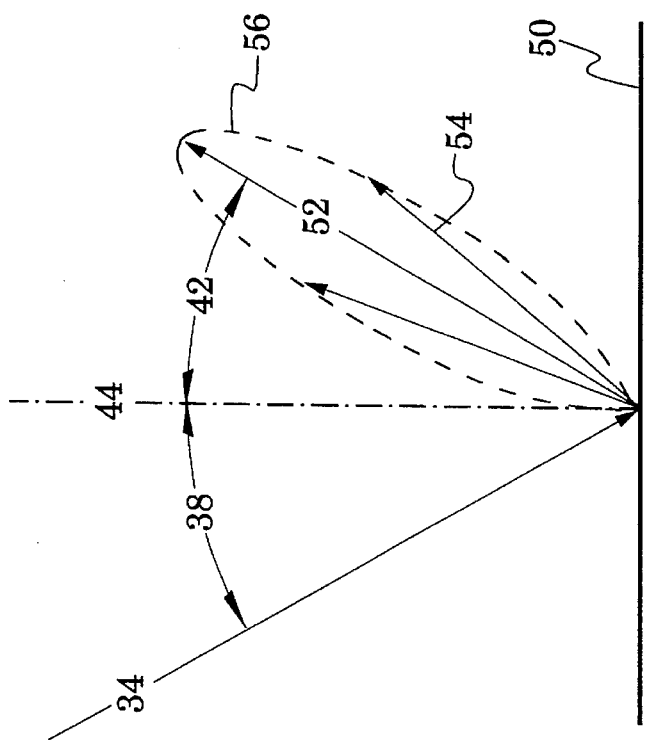
FIG. 3 illustrates radiation reflection from a high-gain screen.
Figure 2:
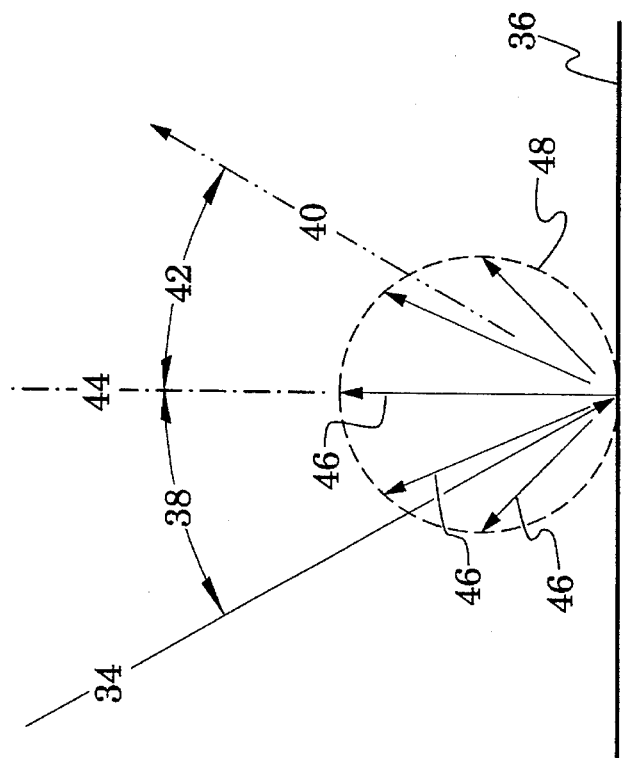
FIG. 2 illustrates radiation reflection from a low-gain screen.
Figure 4:
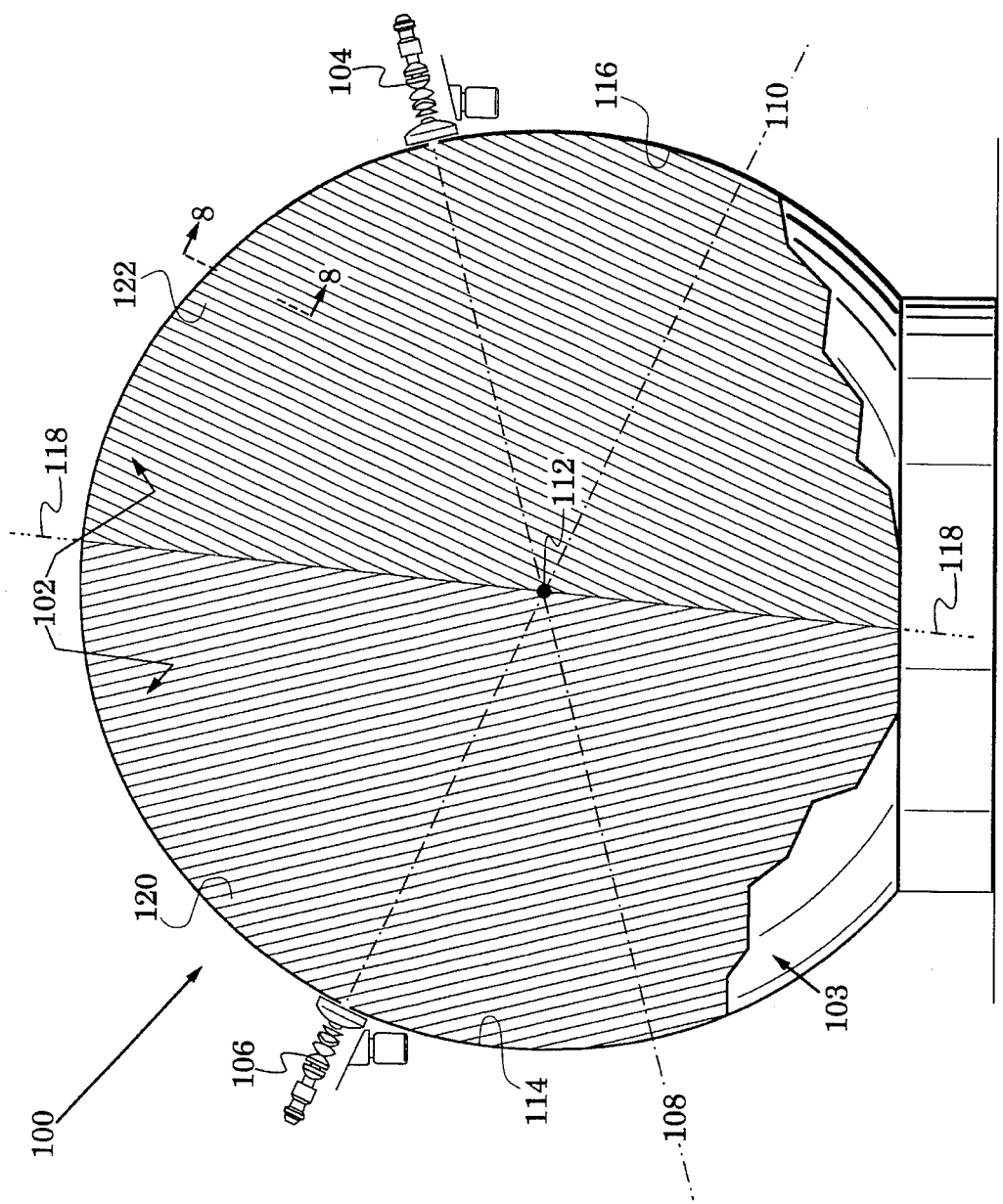
FIG. 4 is an elevation view of a simulator dome having a uniform-brightness, high-gain screen in accordance with the present invention.

FIG. 4 is an elevation view of a flight simulator 100 that has a uniform-brightness, high-gain screen 102 in accordance with the present invention. FIG. 4 is similar to FIG. I in that an aft projector 104 is positioned outside a spherical dome 103 at a desired position such as 0° azimuth, 14° elevation and a forward projector 106 is positioned outside the dome at another desired position such as 180° azimuth, 25° elevation. The radiation from both projectors is directed inward through ports in the dome 103. The projection axes of the projectors 104 and 106 are indicated respectively by the broken lines 108 and 110 which pass through the center of the spherical dome 103. The dome center is the pilot viewing position 112 (indicated by a darkened circle).

The aft projector 104 is configured and positioned to illuminate an aft hemisphere 114 and the forward projector 106 is configured and positioned to illuminate a forward hemisphere 116. These illumination hemispheres meet along a partition line which is preferably tilted at 84.5° and is indicated by extension lines 118 that are outside of the dome 103.

The interior surface of the dome 103 is configured to form a uniform-brightness, high-gain reflecting screen 102. In accordance with the invention, the screen 102 includes a plurality of curved reflecting faces 120 that are associated with the aft hemisphere 114 and the aft projector 104, and a plurality of curved reflecting faces 122 that are associated with the forward hemisphere 116 and the forward projector 106.

The reflecting faces each form at least a portion of a ring in a plane normal to the axis of their associated projector, and each has a different axial spacing from its respective projector. Each of the faces is axially tilted so that the projector-screen angle equals the viewer-screen angle with the result that incident light rays are reflected at the specular angle to the viewing position 112. Because all specular rays intersect the viewing position 112, the screen 102 has a uniform brightness regardless of its specular gain. For clarity of illustration, the width of the faces 120 and 122 is shown much wider than their actual size.

In describing the screen 102, it is helpful to refer to FIGS. 5, 6 and 7. FIG. 5 is similar to FIG. 4, but schematically focuses attention onto one of the projectors, its projection axis through the viewing position 112 and the projector's associated screen hemisphere. FIG. 5 has also been rotated to place the projector's axis in a horizontal plane. In particular, FIG. 5 includes just the projector 106 which is spaced from the viewing position 112 along the projector's axis 110. For descriptive and illustrative clarity, only three reflecting faces 122A–C are shown and their widths are greatly exaggerated.

Each of the faces 122A–C forms at least a portion of a ring (as seen in FIG. 6) which lies in a plane that is transverse to the projector axis 110, and each of the faces has a different spacing from the projector 106. FIG. 5 shows that the face 122B is oriented so that a light ray 130 that issues from the projector 106 is reflected from the face 122B as the specular ray 131 to the viewing position 112. All specular rays from the ring-shaped face 122B will intersect the viewing position 112 because the face is tilted to cause the projector-face angle 132 to equal the viewing position-face angle 134 (projector-face and viewing position-face angles are always defined relative to their respective face normals). FIG. 5 illustrates this relationship for a vertical plane through the projector axis 110, but the relationship is the same along any plane through the axis 110 that intersects the face 122B. The faces 122A and 122C are axially tilted at different angles that will obtain the same result for their specular rays.

As shown in FIG. 7, each reflecting face 122A–C is connected to its neighbor by a non-reflecting face 140. These non-reflecting faces 140 are preferably oriented so that they are not distinguishable from the viewing position 112. The spacings of the reflecting faces 122 along the projector axis 110 from the projector 106 are preferably set so that the faces 122 appear to be contiguous from the viewing position 112.

Each of the faces 122 is flat along any plane through its respective projection axis. In this embodiment, they may each be visualized as being at least a portion of an axially transverse section from a cone in which the cone's apex angle is different for each face. The projector-face angle 132 is actually equal to the viewing position-face angle 134 only along a transverse arc, e.g., the arc [38 of the face 122B. In other embodiments of the invention, the faces 122 can be axially curved so that the projector-face angle equals the viewing position-face angle over the entire face. However, if the axial width of the faces 122 is sufficiently reduced, the deviation of specular rays from the viewing position 112 can be made insignificantly small with axially flat faces.

It is also desirable to have narrow faces for another reason. The faces are preferably narrow enough that they are not distinguishable from each other by a pilot at the viewing position 112. Normal human visual acuity is approximately 1 arc-minute and the radius of the dome 103 is approximately 6.1 meters. At that distance from a vertex at the viewing position 112, 1 arc-minute subtends a height of approximately 1.7 millimeters. With flat faces formed to be this narrow or less, the angular error between any specular ray and the viewing position 112 can be considered to be negligible and the faces will not be apparent to the viewer.

Because the specular rays intersect the viewing position, the screen faces can be formed with a specular gain, relative to a Lambertian screen, without causing brightness variations. However, if a viewer moves away from the viewing position 112, the brightness of the screen 102 decreases because the viewer is moving away from the specular rays, i.e., the projector-screen angle no longer equals the viewer-screen angle. If more than one viewer is present, they cannot both be at the exact viewing position. In this case, it may be desirable to keep the screen gain below a selected value at which each viewer sees approximately the same screen brightness. For example, in a dome having a 12.2 meter diameter, it has been determined that a screen gain of five provides approximately the same screen brightness for a pilot and an operator who is seated behind the pilot in a two-seat, fighter aircraft.

The dome 103 of FIG. 4 is spherical. Thus, in this embodiment of the invention, each of the faces 120 and 122 form at least a portion of a circular ring and the transverse arcs 138 of all of the faces 120 and 122 lie in a common, imaginary spherical surface. In other embodiments of the invention, the faces can form at least portions of non-circular rings, but in all cases they are tilted so that the projector-screen angle substantially equals the viewer-screen angle. In a spherical embodiment of the invention, the distance between the viewer and the screen is constant. This latter feature is advantageous because the pilot's eyes do not have to refocus as the pilot scans the screen.

In the dome screen 102 of FIG. 4, the ring-like faces are preferably formed with a plurality of tiles that line the interior surface of the dome 103. Exemplary tiles 150 are shown in FIG. 8, which is an enlarged view along the plane 8—8 of FIG. 4 (specific tiles are numbered 150A–C). In this embodiment, the tiles 150 are applied in rings or portions of rings which are concentric with a projector axis. In particular, the tiles of FIG. 8 form part of two rings 152 and 154 that are concentric with the axis 110. The sides of the tiles 150 that face the viewing position 112 of FIG. 5 are contoured to define the faces 122. The faces 122 extend over the entire inner tile surfaces, as indicated in FIG. 8 by the broken continuation lines 156.

The tiles can be secured in place in various ways. A preferred technique is to provide adjacent tiles with an interlocking tongue-and-groove structure. FIG. 9 is an enlarged plan view of one of the tiles 150 which employ this technique. The faces 122 are formed in the upper side 158, e.g., by injection molding. Each tile 150 has a groove 159 along two adjacent tile edges 160 and 162, as shown in the enlarged view of FIG. 10. Each tile also has a tongue 163 along the other two adjacent tile edges 166, 168. A beveled facet 169 is formed between the tile's back side 170 and all the edges 160, 162, 166 and 168.

To install the tiles, the back side 170 of each tile 150 is placed against the dome inner surface 172 and then slid into engagement with tiles that have already been installed. For example, in FIG. 8 the tile 150A would be placed against the dome surface and then slid upward and to the left until its tongues 163 engage the grooves 159 of tiles 150B and 150C. As shown in FIG. 10, the tiles 150 are preferably secured to the dome inner surface 172 with an adhesive in the form of a glue 174 that is applied into a recess formed between the inner surface 172 and a tile facet 169.

The glue 174 is preferably one that is cured by the application of ultraviolet light. A preferred tile material is polycarbonate because it is thermally stable and has good glue adhesion. However, it is opaque to ultraviolet light. Accordingly, the glue and its curing light are always applied while a facet 169 is accessible, i.e., before another tile is installed that would hide that facet. For example, in FIG. 8 a glue line would have been applied and cured along the edges 162B and 160C of tiles 150B and 150C respectively, prior to installation of the tile 150A. After tile 150A is slid into engagement with tiles 150B and 150C, a glue line would be applied along its edges 160A and 162A. Then this glue line would be exposed to ultraviolet light for curing before other tiles are slid into engagement.

Another tile embodiment 180 is shown in FIGS. 12 and 13. The tile 180 is similar to the tile 150, with like reference numbers indicating like elements. However, the tile 180 is made of a material that is not opaque to ultraviolet radiation such as various light-weight plastics. The tile 180 does not have facets 169. Instead, its back side 170 is recessed to form a small channel 182 that widens into a flat disk 184. When the tile 180 is in contact with the dome inner surface 172, the channel 182 communicates between an edge of the tile 180 and the disk 184.

Glue is applied by inserting an application needle 188 into the accessible end of the channel 182. Glue flows into the cavity formed by the disk 184 and the dome surface 172. The glue is then cured with ultraviolet radiation. The radiation is preferably directed through the tile edges, e.g., 160, 162, because the upper tile side 158 will generally be prepared with a high-gain, reflective finish. The diameter of the disk 184 is chosen to provide an adequate bonding area with the dome surface 172.

To avoid deterioration of the images projected onto the tile faces 122, the glue must not be allowed to flow onto the tile's upper side 158. Accordingly, a fluorescent dye can be added to the glue. When the glue lines are radiated for curing, the same ultraviolet light will fluoresce, and make visible, the dye in any glue that inadvertently found its way onto the tile's upper sides 158.

It is extremely important to insure that no artifacts are visible to the viewer of the dome's screen 102. Gaps between tiles and discontinuities in the faces 120, 122 must, therefore, be prevented. FIGS. 10 and 11 illustrate that the tile edges 160, 162, 166 and 168 taper outward as they approach the upper side 158 so that the upper edge corners 190 extend outward further than other portions of the edges (other than the tongue 163). When the tiles are slid into engagement with each other, the corners 190 are the first surfaces that abut. This feature eliminates any gaps between tiles.

The surface finish on the upper tile sides 158 should be carefully controlled to achieve the desired specular gain. A mirror-like finish increases the gain, while a rougher surface decreases it. In an exemplary manufacturing process which was calculated to obtain a gain of 5, a stainless steel injection mold was prepared to produce a desired tile shape. The mold was electro-chemically etched to produce a satin-like surface finish. After the tiles were removed from this mold, an aluminum coat 190, shown in FIG. 14, was applied by vacuum evaporation. Afterwards, the finish was overcoated with silicon monoxide 192. The tiles were then measured and found to have a specular gain of 4.92.

Although a silicon monoxide overcoat protects the aluminum from environmental contaminants, e.g., water vapor, its protection may degrade over time due to defects such as microscopic pinholes. A more durable finish embodiment may be formed by replacing the aluminum coat with a nickel-chromium coat (also indicated by the reference number 190). Although nickel-chromium's initial reflectivity is less than that of aluminum, its resistance to reflectivity degradation over time is superior to that of aluminum.

An exemplary tile design for the 12.2 meter diameter dome 103 of FIG. 4 envisions, for each hemisphere 114 and 116, one hundred and ten tile rings which define 12,540 reflecting faces (120, 122) on the front sides of the tiles. The axial width of the faces is 0.889 millimeters, which is comfortably less than the width at which the individual faces would be distinguishable from the viewing position 112. The tilt angle of the faces changes 0.05974534 degrees per degree of elevation from their respective projector axis, until the angle of the faces that are adjacent the hemisphere partition line 118 is 27.375°.

Although each tile ring has unique tile dimensions, the tiles of the seventy sixth tile ring (in which tile ring numbers start at the projection axis intersection with the screen) would measure approximately 10.16 centimeters along the edges 160, 162 and 166 of FIG. 9 and would be slightly longer along the edge 168. In this exemplary design, it is intended to tile the forward hemisphere 116 between 84.5° elevation and −20.652° elevation and the aft hemisphere 114 between 84.5° elevation and −9.652° elevation. The other portions of the dome are not visible from a simulated aircraft that is positioned at the viewing position 112.

For illustrative purposes, the display dome embodiment 100 of FIG. 4 has been described with projectors located at specific azimuth and elevation locations. In general, embodiments of the invention include any display screen that achieves uniform brightness by positioning a plurality of ring-like faces along a projector axis and tilting each these faces to substantially equalize its projector-face angle and its viewer-face angle.

The invention is especially suited for providing uniform-brightness, high-gain display screens in situations that require a significant spatial distance between projectors and viewers. While several illustrative embodiments of the invention have been shown and described, numerous variations and alternate embodiments will occur to those skilled in the art. Such variations and alternate embodiments are contemplated, and they can be made without departing from the spirit and scope of the invention as defined in the appended claims.

We claim:

1. A projection screen for reflecting radiation from a projector to a viewer who is spaced from said projector along a projector-viewer axis, said screen comprising:

a plurality of reflective faces wherein;

each of said faces is shaped in the form of at least a portion of a ring and is positioned in a different one of a plurality of transverse planes wherein each of said transverse planes is transverse to said projector-viewer axis and has a different spacing from said projector; and each of said faces is tilted so that, in any axial plane through said projector-viewer axis which intersects that face, the angle between said projector and a normal to that face substantially equals the angle between said viewer and said normal.

2. The projection screen of claim 1, wherein, relative to a vertex at said viewer, each of said faces subtends an angle of less than 1 arc-minute in any axial plane thorough said projector-viewer axis which intersects that face.

3. The projection screen of claim 1, wherein said ring is a circular ring.

4. The projection screen of claim 3, wherein all of said faces substantially lie in a common spherical surface that has a center at said viewer.

5. The projection screen of claim 1, wherein each of said faces is axially spaced from said projector so as to appear to be contiguous with at least one other of said faces when viewed by said viewer.

6. The projection screen of claim 1, wherein each of said faces has a specular gain greater than one relative to a Lambertian screen.

7. A projection dome for reflecting radiation from a projector to a viewer within the dome who is spaced from said projector along a projector-viewer axis, said dome comprising:

a plurality of tiles that are contiguously positioned over said inner surface with each tile defining a plurality of reflective faces, wherein;

each of said faces is shaped in the form of at least a portion of a ring and is positioned in a different one of a plurality of transverse planes wherein each of said transverse planes is transverse to said projector-viewer axis and has a different spacing from said projector; and each of said faces is tilted so that, in any axial plane through said projector-viewer axis which intersects that face, the angle between said projector and a normal to that face substantially equals the angle between said viewer and said normal.

8. The projection dome of claim 7, wherein each of said tiles is formed of polycarbonate plastic.

9. The projection dome of claim 7, wherein;

each of said tiles has a perimeter;

a portion of said perimeter defines a tongue; and another portion of said perimeter defines a groove configured to receive the tongue of another of said tiles when said tiles are contiguously positioned.

10. The projection dome of claim 9, further including an adhesive adhering each of said tiles to said inner surface.

11. The projection dome of claim 10, wherein each of said tiles defines a facet on said perimeter to receive said adhesive.

12. The projection dome of claim 10, wherein each of said tiles defines a recess extending inward from said perimeter to receive said adhesive.

13. The projection dome of claim 10, wherein said adhesive is curable by the application of ultraviolet light.

14. The projection dome of claim 7, wherein, relative to a vertex at said viewer, each of said faces subtends an angle of less than 1 arc-minute in any axial plane through said projector-viewer axis which intersects that face.

15. The projection screen of claim 7, wherein ring is a circular ring.

16. The projection dome of claim 7, wherein all of said faces substantially lie in a common spherical surface that has a center at said viewer.

17. The projection dome of claim 7, wherein each of said faces is axially spaced from said projector so as to appear to be contiguous with adjacent faces when viewed from said viewer.

18. The projection dome of claim 7, wherein each of said faces has a specular gain greater than one relative to a Lambertian screen.

19. The projection dome of claim 7, further including;

aluminum coatings on said tile faces; and silicon monoxide overcoats on said aluminum coatings.

20. The projection dome of claim 7, further including a nickel-chromium coating on each of said tiles.

21. A method for reflecting radiation from a projector to a viewer who is spaced from said projector along a projector-viewer axis, said method comprising the steps of;

shaping each of a plurality of reflective faces in the form of at least a portion of a ring;

positioning said faces so that each lies in a different one of a plurality of transverse planes wherein each of said transverse planes is transverse to said projector-viewer axis and has a different spacing from said projector;

tilting each of said faces so that, in any axial plane through said projector-viewer axis which intersects that face, the angle between said projector and a normal to that face substantially equals the angle between said viewer and said normal; and illuminating said faces with said radiation from said projector.

22. The method of claim 21, further including the step of arranging said faces to appear contiguous to said viewer.

23. The method of claim 21, further including the step of configuring each of said faces to have a specular gain greater than one relative to a Lambertian screen.

* * * * *